United States Patent [19]
Snyder et al.

[11] Patent Number: 5,450,530
[45] Date of Patent: Sep. 12, 1995

[54] HIGH SPEED RECEIVER/TRANSMITTER INTERFACE

[75] Inventors: Kenneth R. Snyder, Irvine; George C. Sneed, Westminster; James Y. Wilson, Huntington Beach; Kevin P. Kenney, Costa Mesa; Chee W. Kwan, Garden Grove, all of Calif.

[73] Assignee: Rockwell International Corporation, Seal Beach, Calif.

[21] Appl. No.: 147,191

[22] Filed: Nov. 3, 1993

[51] Int. Cl.⁶ .................. H04B 1/38; H04L 5/16
[52] U.S. Cl. .................. 375/220; 375/222
[58] Field of Search .......... 375/7, 8, 118, 220, 375/222, 219, 371, 257, 377, 36, 121; 379/93; 364/919.1

[56] References Cited

U.S. PATENT DOCUMENTS

| | | | |
|---|---|---|---|
| 5,012,489 | 4/1991 | Burton et al. | 375/8 |
| 5,214,650 | 5/1993 | Renner et al. | 379/93 |
| 5,283,819 | 2/1994 | Glick et al. | 379/93 |

*Primary Examiner*—Stephen Chin
*Assistant Examiner*—Tesfaldet Bocure
*Attorney, Agent, or Firm*—George A. Montanye; David J. Arthur; Susie H. Oh

[57] ABSTRACT

A high speed interface receiver/transmitter is particularly suitable for enhancing data throughput rates between a DTE and a DCE, such as a modem. The high speed interface includes a driver programmed with high speed processing software. The driver operates in conjunction with modem firmware programmed in a programmable memory within the DCE to implement special firmware handshake protocol which enables the DTE to transmit or receive data as fast as necessary to sustain the required data rate of a particular operating mode.

18 Claims, 5 Drawing Sheets

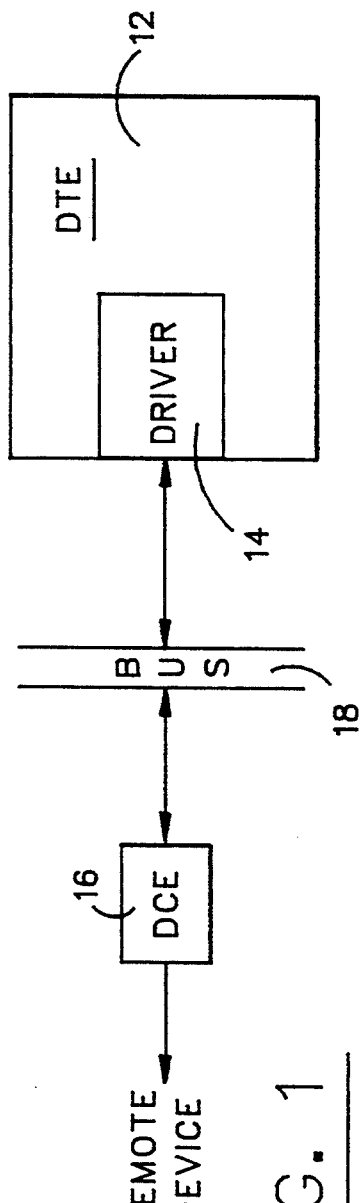
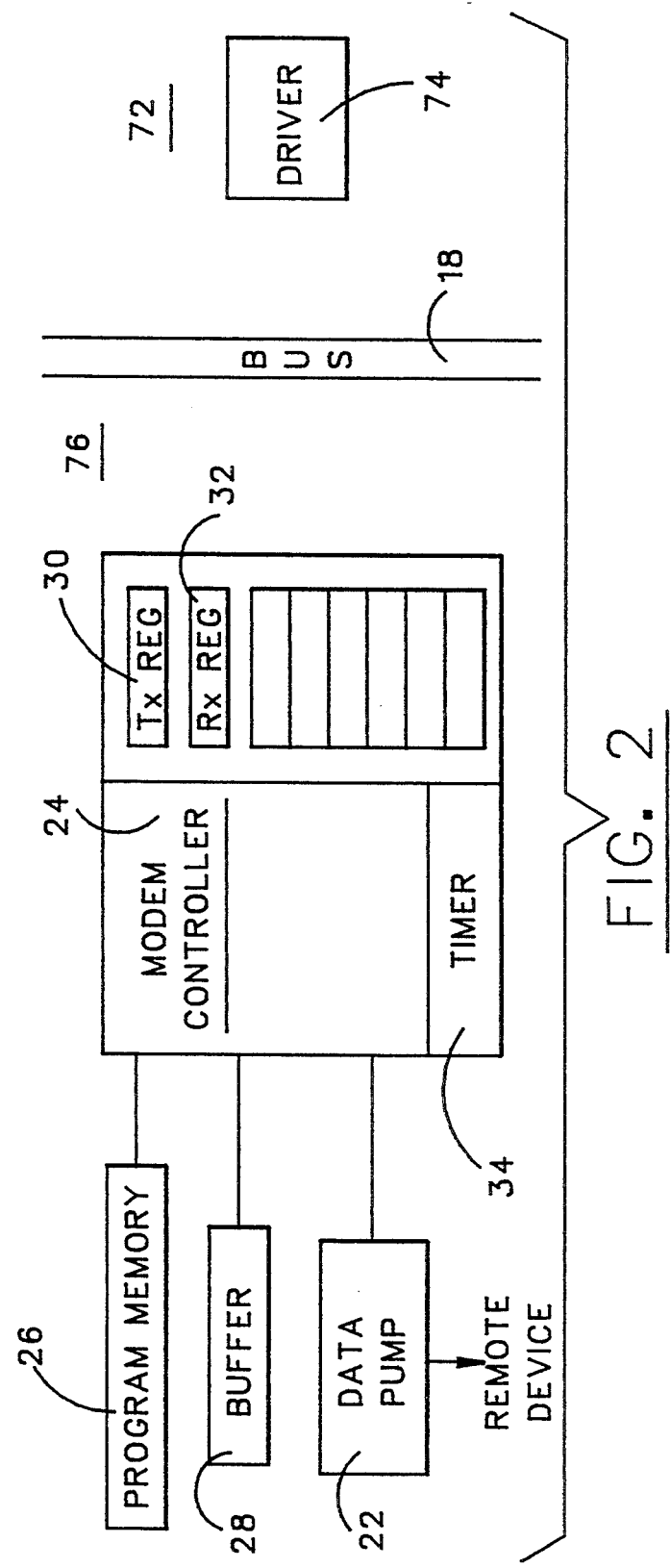

HIGH SPEED RECEIVER/TRANSMITTER INTERFACE

BACKGROUND OF THE INVENTION

1. Field of the Invention

The present invention relates to data transmitting and receiving interface devices and, more particularly, to a combined hardware and software interface that substantially increases the speed of data transmission and reception between a variety of communication devices.

2. Description of Related Art

With the increase in the development of computer and telephone communications systems requiring expanded data conversion and processing capabilities, there is a continuing need to minimize error and data loss between data terminal equipment (DTE) and data communication equipment (DCE). For example, the increased use of audio technology requires high speed voice data processing capabilities at very high sampling rates. Such advanced technologies, in turn, require extremely fast data throughput processing for transmitting and receiving voice data through the DCE. Increased processing, however, tends to produce the aforementioned undesirable data errors and losses.

A conventional DCE implementation generally includes a modem (modulator/demodulator) coupled to the DTE. The DTE typically includes an arrangement of a personal computer (PC) having a central processing unit (CPU) and additional processing devices which may be internal or external to the base computer. The PC CPU typically drives all or most of the operating functions of the PC. To communicate with other data processing devices, the PC may be coupled to the DCE, e.g., the modem peripheral, by a serial or parallel data bus.

A conventional modem peripheral may include a standard universal asynchronous receiver/transmitter (UART) or UART emulator in which the format of incoming data is converted. A UART device is necessary to achieve compatibility between a standard PC and a serial peripheral device, such as a modem. A UART essentially functions as a serial-to-parallel or parallel-to-serial converter, depending upon whether the modem is in a receive or transmit mode, respectively. As shown in FIG. 5, within the modem peripheral device 500, a UART 501 is coupled to a modem controller 502 which has another UART 504 embedded therein. Parallel data signals may be directed across a DTE/DCE interface bus 514 via an application program 516 coupled to the standard PC (not shown). The data signals are processed by the UART 501 and converted to serial format. The serial data 508 output from the first UART 501 is converted by the modem controller 502 to parallel data, and is processed and manipulated through one or more memory devices 512. The modem controller 502 includes embedded firmware 520 held in a ROM for controlling the operation of the controller 502. For example, the firmware 520 may be used to pass data, accept data, and other similar functions for which it may be prohibitive to except discrete hardware to perform. Typically, the embedded firmware is considered part of the controller hardware. Ultimately, the data is passed through a data pump 506, and output over the public switched telephone network (PSTN) 510 or other output device, such as a speaker in the case of audio data. Likewise, data from the PSTN or microphone is converted to serial by the modem controller UART 504 and converted to parallel by the PC UART 501, and directed to the PC application program 516.

Referring to FIG. 5, the primary function of the modem 500 is to allow the transmission and reception of data over a telephone medium 510, e.g., via established telephone lines. In addition, other voice modes may be used in which a phone line is not required. For example, analog voice signals may be passed to or from other hardware, such as speakers or microphones directly, without the involvement of a telephone line. In any case, transmitted and received signals comprise analog waveforms which are modulated and demodulated to create and interpret the signals that carry data or voice over the telephone lines or other hardware interfaces.

More particularly, a standard UART in a modem device typically processes data by receiving a "block" of data from either the DTE (during a transmit operation) or a remote DCE (during a receive operation). Upon processing and, thus, converting the data format, the UART outputs the data to the DCE or the DTE during a transmit or receive operation, respectively. After each data output activity performed by the UART, the modem controller causes an interrupt request to be sent to the DTE to request transmission or reception of another block of data. In some instances, the PC may use polling to continuously inquire if data should be read or written.

For example, a 1-byte deep UART operates by transmitting or receiving 1 byte of data in response to each interrupt request. During a transmit operation, for example, as data is transmitted from the CPU to the UART, it is first processed through a holding register before being moved into a shift register. As the data leaves the UART holding register, the holding register becomes empty. Upon detection of the empty condition by the modem controller, an interrupt request is sent to the CPU requesting another byte of data. The above-described sequence is then repeated. Another type of conventional UART includes a 16-byte deep holding register which enables the transfer of up to 16 bytes of data at one time before the CPU is interrupted for service (i.e., to transmit or receive an additional block of data). Thus, the CPU may maintain up to 16 character times worth of data in the holding register before responding to another interrupt request from the UART.

UART emulation (see generally FIG. 6) effectively presents itself in UART format 600 by utilizing a timer and predesignated data registers 602 to emulate the UART function. It will be recognized, however, that but for the sake of compatibility with the DTE software, there is no need to actually serialize data. In standard UART emulators, a clock timer inserts standard-length data transfer delays which would otherwise be representative of a conventional UART. However, because UART emulators are, by definition, designed only to mimic the data processing functions of a standard UART, the data processing rates are accordingly limited.

Although conventional UARTs may be adequate for a variety of computer applications, it has been found that some input/output (I/O)-intensive computer processes require even greater throughput and performance than that available using standard serial I/O interfaces due to ever-increasing modulation speeds and increased functions such as voice and audio transmission. Depending upon the particular application software being used, the PC may not have sufficient time to service all of the processing interruptions. The time constraints are often attributable to competing interrupt sources and/or latency effects introduced by other interrupt mechanisms which are inherent in the DTE hardware and/or the operating system. Accordingly, insufficient PC time and effort may be available for driving and supporting a high data rate in addition to the data processing requirements of other software applications which may be concurrently running, thus resulting in losses of data.

For example, a communication application generally includes what may be considered foreground and background tasks (these terms may be reversed). The foreground may comprise multiple specially-installed programs which operate at a predetermined rate, while the background include tasks which must occur promptly upon receiving a particular signal such as an interrupt. In this example, data may be moved from or to the DCE by the background, and then moved to the DTE by the foreground. However, if the background is slow and requires excessive time to complete its functions, and thus cannot service the DCE sufficiently promptly, or if the background leaves insufficient time for the communication application foreground to keep up with the background data flow, data overruns and underruns could occur.

It is believed that one cause of undesirable delays in PC response times is attributable to the amount of time spent on servicing the sometimes large number of interrupt request. For example, in a computer system in which the data exchange/transmission rate between the DTE and the modem is 9600 bits per second (bps), the pulsewidth of each bit time is approximately equal to 100 microseconds. Thus, the time necessary to output one data bit is approximately 100 microseconds. However, if the CPU sends 1 byte (8 bits) of data, the actual number of bits typically includes one start bit and one stop bit in addition to the 8 data bits, totaling 10 bits. Accordingly, each byte of data transmitted at 9600 bps between the host CPU and the modem peripheral requires approximately 1 millisecond of time (10 data bits multiplied by 100 microseconds per bit).

Furthermore, because in some UARTs each interrupt request comprises one byte of data (e.g., in a 1-byte deep UART), each interrupt request sent to the DTE by the modem controller is periodically set at 1 millisecond intervals. As a result, approximately two milliseconds of CPU processing time could be required to respond to each interrupt request. If a large amount of data is to be transmitted or received, the amount of CPU processing time expended on servicing the interrupt could become significant. More particularly, because a large number of interrupts may occur requiring long interrupt service times, the DTE time spent for interrupt service may exceed the period of the interrupt. Data may also be lost if the DTE spends additional time which exceeds the period of the interrupt in other interrupt services or system-critical tasks which may occur at unpredictable times and rates, beyond the control of the interrupt routine.

Another time-limiting disadvantage attributable to the DTE response time necessary to service pending conditions is called latency. Latency refers to the time necessary for the DTE to notice and begin to service an interrupt request. Latency also refers to the time necessary for the modem to notice that the transmit register contains data or that the receive register is empty. Undesirable latency periods may occur when the DTE is too busy to service data before it is lost or if the PC is waiting to send or receive data while it services the interrupts. The length and occurrence of latency periods are generally random and often depend upon other processing being performed by the operating system at any time. Such processes may include preparing data for transmission and storing received data.

Thus, it is desirable to maximize the data transfer rate between the DTE and the DCE, yet also to minimize the number of PC interrupts and the accompanying interrupt overhead. Accordingly, it is also desirable to expend DTE processing time to drive certain operating tasks while simultaneously maintaining its modem processing responsibilities, such as servicing interrupt requests. For example, a PC must often maintain the ability to receive data such is fax, voice message or other uploaded files, while concurrently performing a variety of other tasks such as compilation, printing, or word processing.

In particular, with respect to I/O-intensive Microsoft windows application, it has been found that data processing errors may occur when a modem peripheral device is used simultaneously with other windows environment. Because a substantial amount of CPU time and effort are directed to operating the windows application and since the CPU may be visibly servicing other foreground and background operations, the DTE may be unable to immediately service the UART interrupts. Thus, increased data processing and communications throughput rates have been sought to address the requirements of new and existing applications programs which require significantly higher data transfer rates.

SUMMARY OF THE INVENTION

A high speed interface according to the present invention is particularly suitable for use in computer systems which require enhanced high speed data transfer rates between a host DTE and a DCE. In a preferred embodiment, the interface comprises a data manipulation scheme in which the data transfer rate between a host CPU and a data processing and conversion device is substantially increased by disabling conventional UART data transfer rates, maximizing available processing time and space, and by significantly decreasing the number of CPU interruptions. As a consequence, the amount of PC time expended on servicing the interrupts is also decreased, while the system performance and reliability are substantially enhanced, enabling the PC to perform a variety of tasks simultaneously.

In the particular environment of a modem peripheral device coupled to a PC, the high speed interface includes an interface controller which manipulates the interaction of data between the DTE serial port driver and the modem peripheral. The interface controller is programmed with high speed firmware which cooperates with the driver to execute commands directing the DTE to transmit and receive data in much larger quantity than is possible with standard UART data transfer during any single interrupt request. Data is transferred according to the presence of data, rather than a predetermined data rate. Thus, large amounts of data can be continually transmitted by the host CPU to the modem in response to only a small number of interrupts. As a result, the CPU time spent on servicing interrupts, i.e., expended on interrupt overhead, is significantly reduced as the data throughput rate is increased.

More particularly, in an embodiment of the present invention, the interface includes two primary components: a serial port software driver coupled to the DTE for sending and executing commands requiring the DTE to cooperate with the DCE; and a modem controller having a plurality of registers dedicated to specific functions such as data storage and status information. The modem controller is coupled to a programmable memory for storing modem firmware and system protocol and another form of memory device, such as a random access memory (RAM). The system protocol is implemented by the modem firmware which communicates with the driver to present a high speed I/O interface compatible with existing DTE configurations and applications.

BRIEF DESCRIPTION OF THE DRAWINGS

FIG. 1 is a general block diagram of a high speed communication interface according to a preferred embodiment of the invention.

FIG. 2 is a detailed block diagram of a high speed communication interface coupling DTE and DCE according to FIG. 1.

DETAILED DESCRIPTION OF THE PREFERRED EMBODIMENTS

Figure 3:
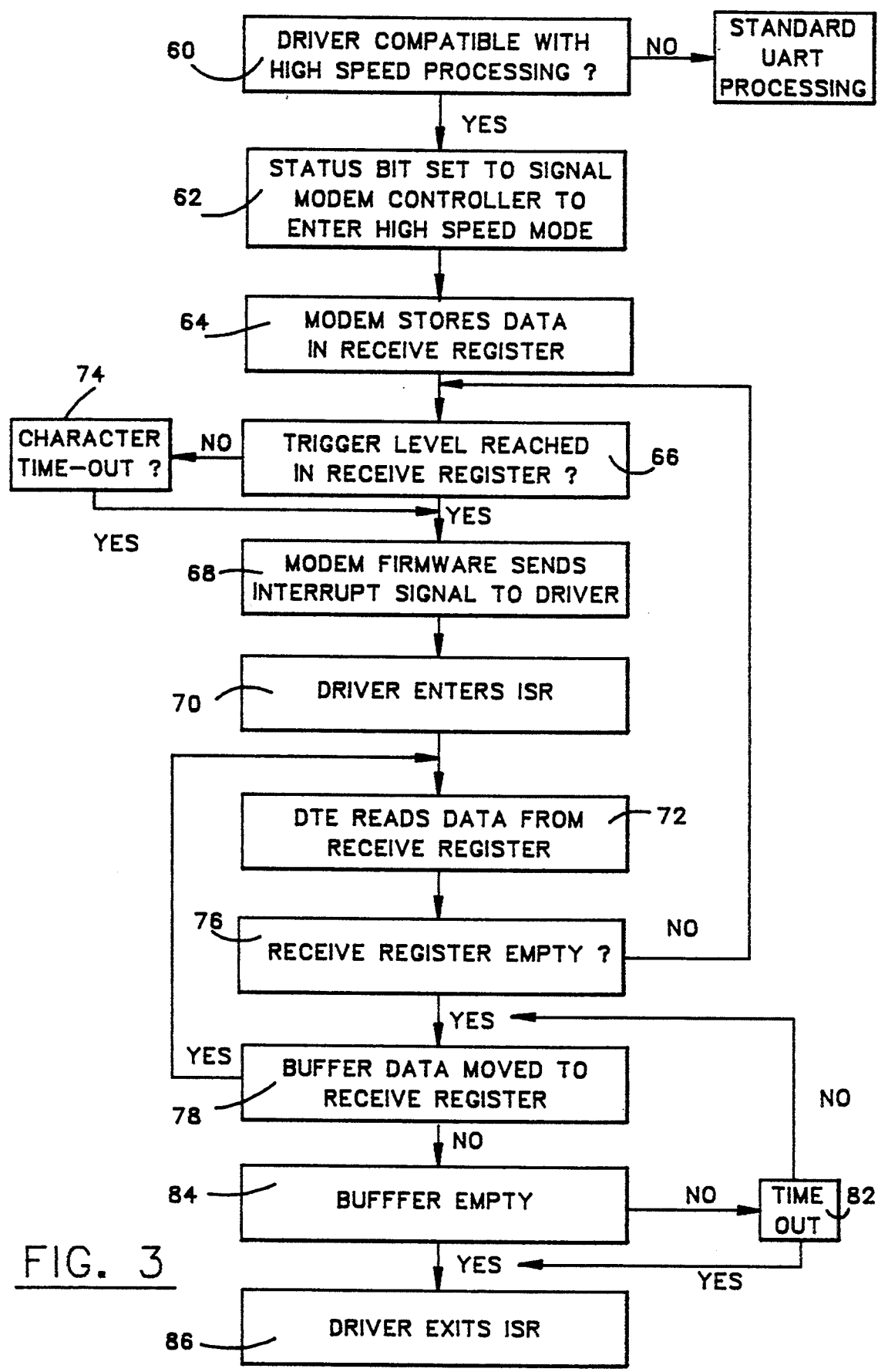
FIG. 3 is a flow diagram illustrating a receive operation according to an embodiment of the present invention.

The following description is of the best presently contemplated mode of carrying out the invention. In the accompanying drawings, like numerals designate like parts in the several figures. This description is made for the purpose of illustrating the general principles of embodiments of the invention and should not be taken in a limiting sense. The scope of the invention is determined by reference to the accompanying claims.

Data terminal equipment (DTE) in communication with data communication equipment (DCE) in accordance with a preferred embodiment of the invention is indicated generally at 10 in FIG. 1. Interface embodiments of the present invention are particularly suitable for providing high speed throughput capabilities to accommodate the reception and transmission of data, such as modem, fax or voice message data, by the computer system in its operating environment, while the computer simultaneously performs other software application tasks such as data compilation, printing, word processing, etc.

Accordingly, embodiments of the present invention address the needs of communications systems which require extremely fast data throughput, while allowing continuous, uninterrupted operation of simultaneously operating routines such as the Microsoft windows operating system. It will be recognized that other types of applications, such as business audio or multimedia programs, driven by conventional PCs and other microprocessor-based systems, may also be supported by the high speed interface embodiments of the present invention.

In the preferred embodiment, the present invention operates in a DCE modem environment in which data is transferred between the DTE and a modem peripheral coupled to public access telephone lines. It will be recognized, however, that other data processing and conversion devices, such as printers, fax machines, recording devices, and the like, may also be implemented. The present invention effectively minimizes the interrupt rate and, therefore, the interrupt overhead and DTE I/O time associated with servicing interrupt requests by providing a dedicated serial port driver, e.g., a windows communications driver, to coordinate with the modem peripheral to effectively increase data throughput rates.

This high speed throughput is achieved by particularly programming the serial port driver to cooperate efficiently with the DCE which, in turn, is provided with associated firmware. Thus, by implementing firmware and software modifications, yet utilizing existing hardware components of a standard UART emulation interface, the significant advantages of high speed processing can be attained quickly and relatively inexpensively.

The present invention thus takes advantage of the standard UART emulation support to present an unchanged appearance to existing program applications, while enabling significantly increased data throughput rates. Thus, the present invention provides advantages over other interface devices in that additional application-specific hardware need not be incorporated therein. The circuit components and other devices typically used in standard modem communications systems need not be redesigned or replaced. Rather, by implementing high speed processing protocol and program software and firmware specially installed in the DTE and the DCE, interface embodiments of the present invention may be utilized for basic UART functions as well as for high speed processing in which UART emulation is circumvented.

For example, an embodiment of the present invention may be incorporated on an existing integrated circuit (IC) microcomputer, such as a C39 modem controller manufactured by Rockwell International Corporation. The C39 controller includes a 16-byte UART interface in which data is transferred between the DTE and a FIFO register in 16-byte blocks. By implementing high speed processing software and firmware in the DTE serial port driver and the DCE, however, the standard C39 controller can be modified to provide significantly increased data throughput rates.

Embodiments of the present invention consequently reduce system latency, thereby enhancing and improving the robustness of the system against unpredictable latency periods. By projecting detailed knowledge of the state of the internal modem memory to the driver, the DTE is informed that data is backing up in the modem, and can thus "make up" for lost time due to a previous latency whenever processing time becomes available. That is, the DTE has prior Knowledge of the quantity of data stored in the modem memory, and can therefore compensate for earlier latency period by allocating current processing time to service the condition.

As illustrated in FIG. 1, the DTE 12 is provided with a serial port software driver 14 coupled to the DCE 16 across a parallel data bus 18. As noted above, the DCE is preferably a modem peripheral device. It is contemplated that the DTE 12 may comprise a personal computer, a laptop computer, an automated teller machine, a facsimile device, or a variety of other data processing systems that can access other computer systems. The use of a PC in preferred embodiments is described herein.

The PC may include a digital computer, a keyboard, an internal controller, in addition to memory devices such as RAM and ROM, and hard and/or floppy disk drives. In addition, the PC preferably has modem access capabilities. As will be described in more detail below, the driver may be installed and accessed in either the DTE floppy disk drive or a hard disk, if available, and depending upon the particular application program being executed.

In the embodiment of FIG. 1, the DTE serial port driver 14 is coupled to the modem 16 across a parallel data bus 18, such as an RS 232 communication interface port. Preferably, the modem 16 is internal to the PC. It will be recognized that in alternate embodiments, however, the modem may be coupled externally to the PC. The driver 14 drives the operations of the DTE 12 and acts as the primary interface between the PC and the modem 14. As described in greater detail below, special data processing software and firmware are specially programmed in the driver 14 and the modem 16 to implement and control the high speed processing and transfer of data between the modem 16 and the DTE 12.

The serial port driver is configured with special interface software to provide essential programming steps for sequential execution by the DTE 12 to control the function and operation of data throughput by the modem 16. The driver software allows the DTE 12 to cooperate with the DCE 16 to implement high speed programming according to preferred embodiments of the present invention. In the preferred embodiment, the serial port software driver 14 is included on one or more floppy disks which can be inserted into a floppy disk drive (not shown) included with or attached to the PC. The driver 14 is then installed in the hard disk drive within the PC.

It will be recognized that in other embodiments the driver may be included as part of an underlying or existing operating routine or other software application performed and accessed by the DTE 12. For example, embodiments of the present invention may be implemented with existing or new software intended to take advantage of the significantly higher data transfer speeds such as business audio. With regard to the Microsoft windows operating program which requires a serial communication interface provided by a standard UART, a special windows device driver may be implemented to directly access high speed data processing capabilities without presenting a changed interface configuration to the DTE application program. Thus, high speed driver software may be incorporated directly into a windows driver.

Referring to FIG. 2, the modem 16 includes a modem controller 24, a programmable memory 26, a buffer memory 28, a set of eight data registers, and a data pump 22. The data pump 22 receives data from and transmits data to from devices such as telephone lines, microphones or speakers, depending upon the application using the DTE 12. It is recognized that a data pump may eventually be replaced by or become obsolete due to expanded uses of digital voice communications technologies and the like.

The modem 16 and its modem controller 24 are preferably composed of standard modem components controlled by a coordinated firmware handshake protocol which will be described in more detail below. As noted above and illustrated in FIG. 2, the modem controller 24 includes a set of registers 36 comprising a transmit register 30 and a receive register 32, with the remaining registers dedicated to status and control fields which indicate whether data can be sent or retrieved by the DTE 12, among other functions. For compatibility with existing UART emulation devices, the transmit and receiver registers are preferably 1 or 16-bytes deep. Accordingly, up to 16 bytes of data may be temporarily stored in these registers.

Preferably, the modem controller 24 also includes a clock timer circuit 34 which is necessary for UART emulation. As described above, in UART emulators, a timer is necessary to provide simulated character rate timing to transfer a certain number of bytes of data at predetermined time intervals. Unlike UART emulation, however, embodiments of the present invention do not require simulated timing. Consequently, when operating in a high speed processing mode, the function of the clock is bypassed and the pretense of sending artificial interrupt requests at specific intervals is eliminated.

As illustrated in the preferred embodiment of FIG. 2, the modem controller 24 is coupled to a programmable memory 26 and a data buffer 28. The programmable memory may comprise an EPROM, PROM, ROM or other memory device. The programmable memory 26 may be externally coupled to the modem controller 24 across an expansion bus; or, depending upon the detail and design of the particular controller used, the programmable memory may be contained within the controller chip itself.

Similarly, the externally-coupled data buffer 28 may also be included within the modem controller depending upon size limitations and other design factors. Preferably, the data buffer 28 comprises a RAM. In preferred embodiments, the storage size of the RAM may range from 100 bytes to over 16K bytes, depending upon the type of communications data, e.g., fax, voice, or data, being processed. Or, the RAM buffer size may be determined by the driver 14 which determines the type and rate of data transfer from the DTE 12. As described in more detail below, the contents of the RAM 32 and the movement of data between the buffer 28 and the transmit or receive registers are maintained by modem firmware programmed in the programmable memory 26.

In preferred embodiments, the high speed data transfer between the modem controller 24 and the DTE 12 is controlled by a handshake protocol enacted by the modem firmware installed in the programmable memory 26 in conjunction with the serial port driver in the DTE. This protocol controls and manipulates the rate and quantity of data transfer between the DTE 12 and the DCE 16 to allow data to be continually transmitted or received by the DTE during a single interrupt period. Consequently, data can be moved quickly and efficiently across the interface embodiment without requiring the DTE to respond to a particular data transfer rate or timing scheme as is required in UART emulation.

The DTE 12 transmits and receives data in response to the modem firmware. The modem firmware monitors and controls the data processing activity of the modem, while the driver 14 provides commands to the DTE 12 in response to the modem activity to control and monitor the data movement to and from the DTE 12. For example, the driver 14 indicates whether the data throughput scheme requires high speed processing capabilities. Depending upon the type of data being transferred between the DTE 12 and a remote DCE, the driver may determine that the particular type of data requires significantly faster data throughput to avoid undesirable overruns or underruns of data.

TRANSMIT OPERATION

Referring to FIG. 3, if the high speed interface software is properly installed and the driver has determined 40 that high speed data throughput is achievable, the driver sends 46 a signal to the modem controller to enter high speed data transfer mode. Accordingly, the modem controller timer is disabled and the data to be transmitted by the DTE will be transmitted according to the high speed interface embodiments of the present invention.

More particularly, as indicated in FIG. 3, the serial port driver monitors and responds to the status registers in the modem controller, and thus the modem firmware, to determine when the transmit register is empty (i.e., any data contained therein has been read out by the modem). If the transmit register is empty 42, a status bit signals the driver 44, which activates an interrupt service routine (ISR) within the driver 46. If the DTE has data to be transmitted, the driver ISR will initiate and carry out the data transfer 48.

Accordingly, the DTE will begin sending data to the transmit register until the register is filled 50 (e.g., with 16 bytes of data in a 16-byte deep FIFO register). The modem firmware causes the 16 bytes of data to be moved to the modem's internal data buffer 52 and, as long as it is able to accept more data, the modem firmware responds with an acknowledge status bit 54 indicating that the data is being moved from the 16-byte transmit register. The acknowledge bit remains on while data is continually moved in 16-byte blocks from the transmit register to the buffer. As long as the acknowledge bit remains on, the DTE will continue to transmit data until it is finished without exiting the driver ISR.

For example, 16-bit voice data sampled at 11.025 KHz requires a DTE/DCE serial bit rate of approximately 176 Kbps. Standard modems, however, typically operate at substantially lower rates such as 9600 bps. The disparity in required speed versus a maximum possible system speed can result in unavoidable losses or breaks in data communication. Accordingly, depending upon the capabilities of the DTE in communication with the DCE, the processing speed most compatible with existing data and software conditions will be implemented.

In the preferred embodiment, the interface protocol enables communication between the DTE 12 and the modem 16 to determine whether the DTE 12 is available and ready for high speed processing. The modem controller 24 sends and responds to signals to/from the serial port driver to make the protocol determination. Accordingly, the driver 14 queries the modem controller 24 to verify whether the modem is compatible with high speed processing.

Figure 4:
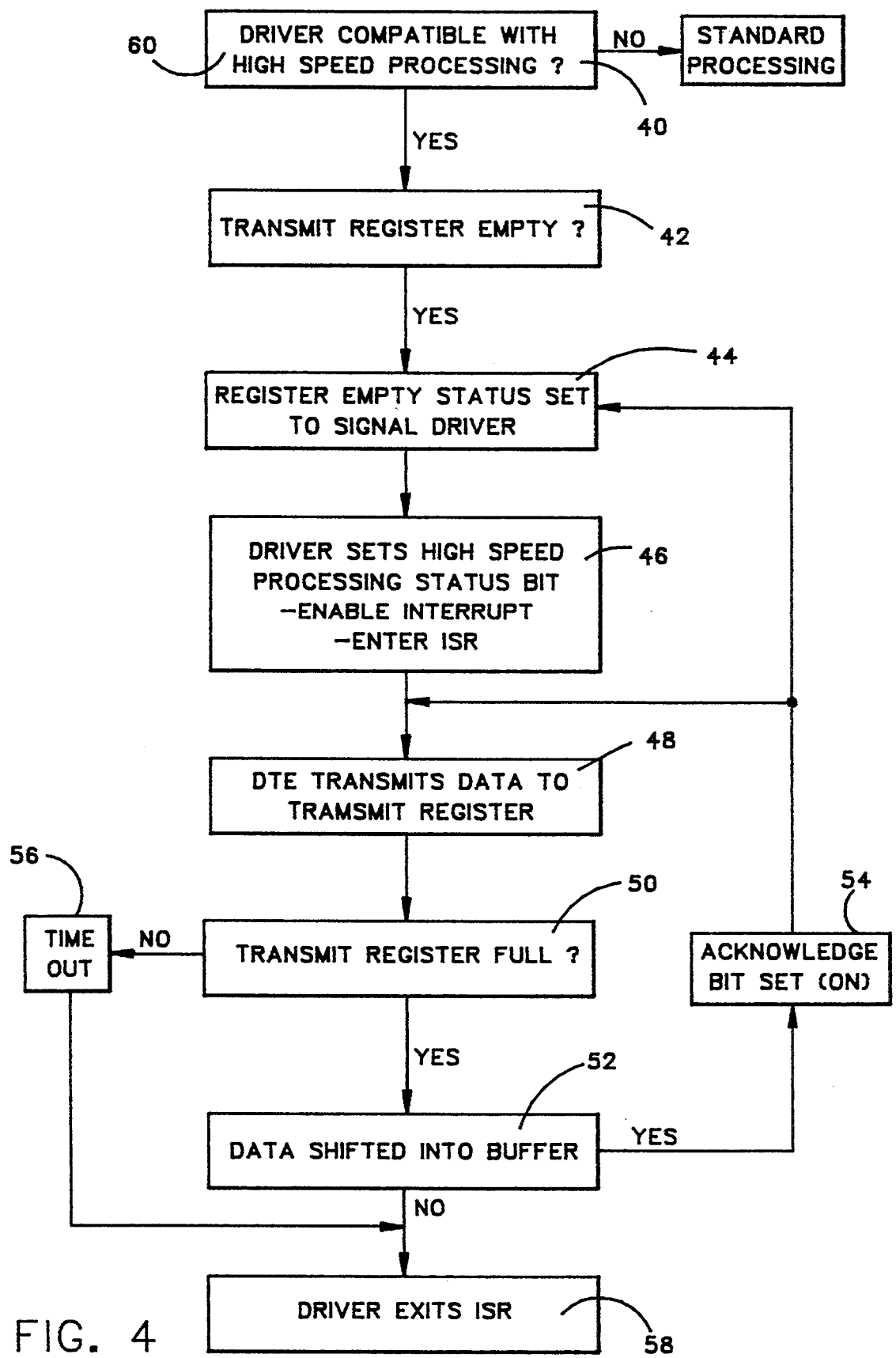
FIG. 4 is a flow diagram illustrating a transmit operation according to an embodiment of the present invention.
Figure 5:
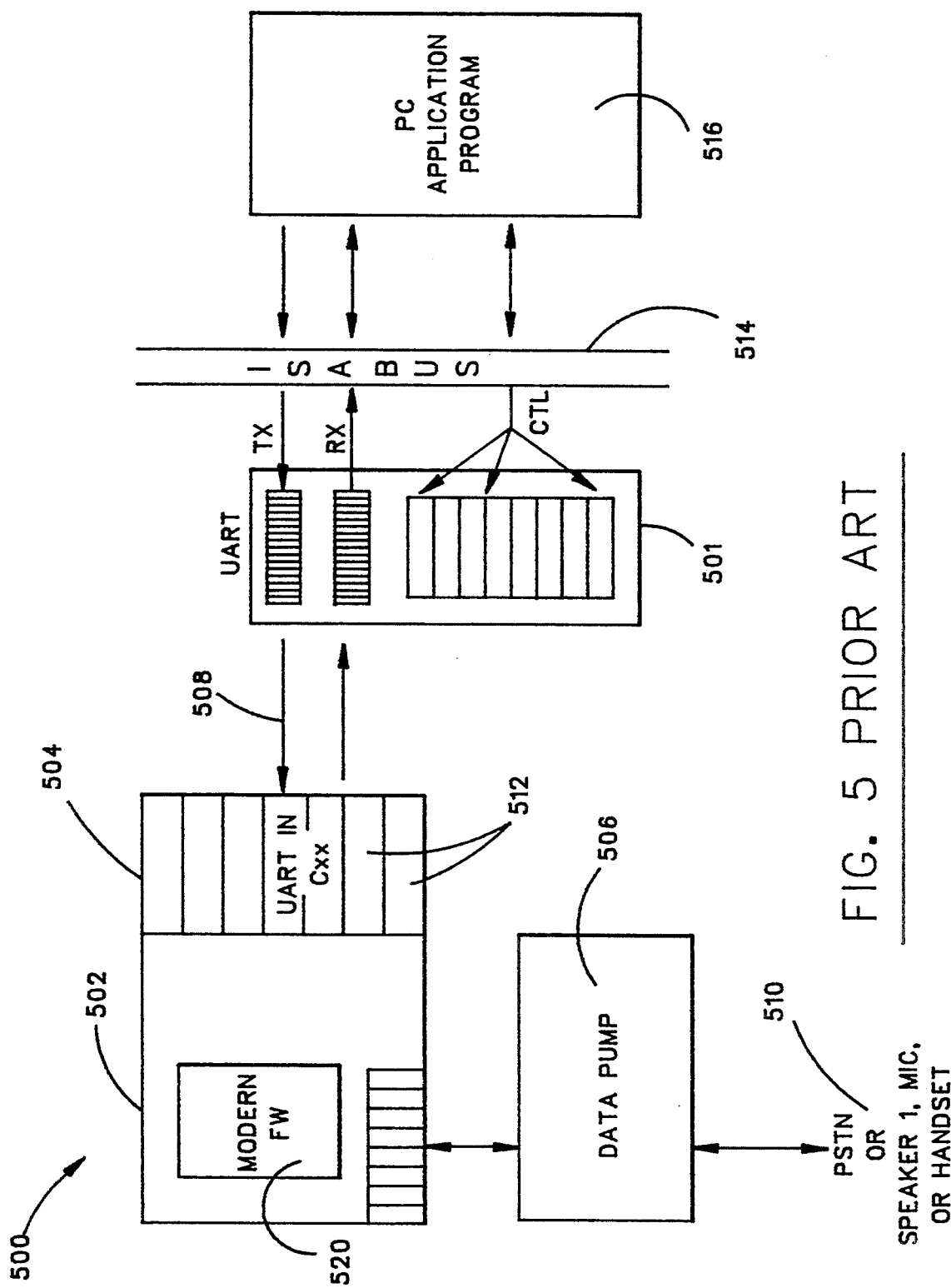
FIGS. 5 and 6 represent prior art communication interfaces.
Figure 6:
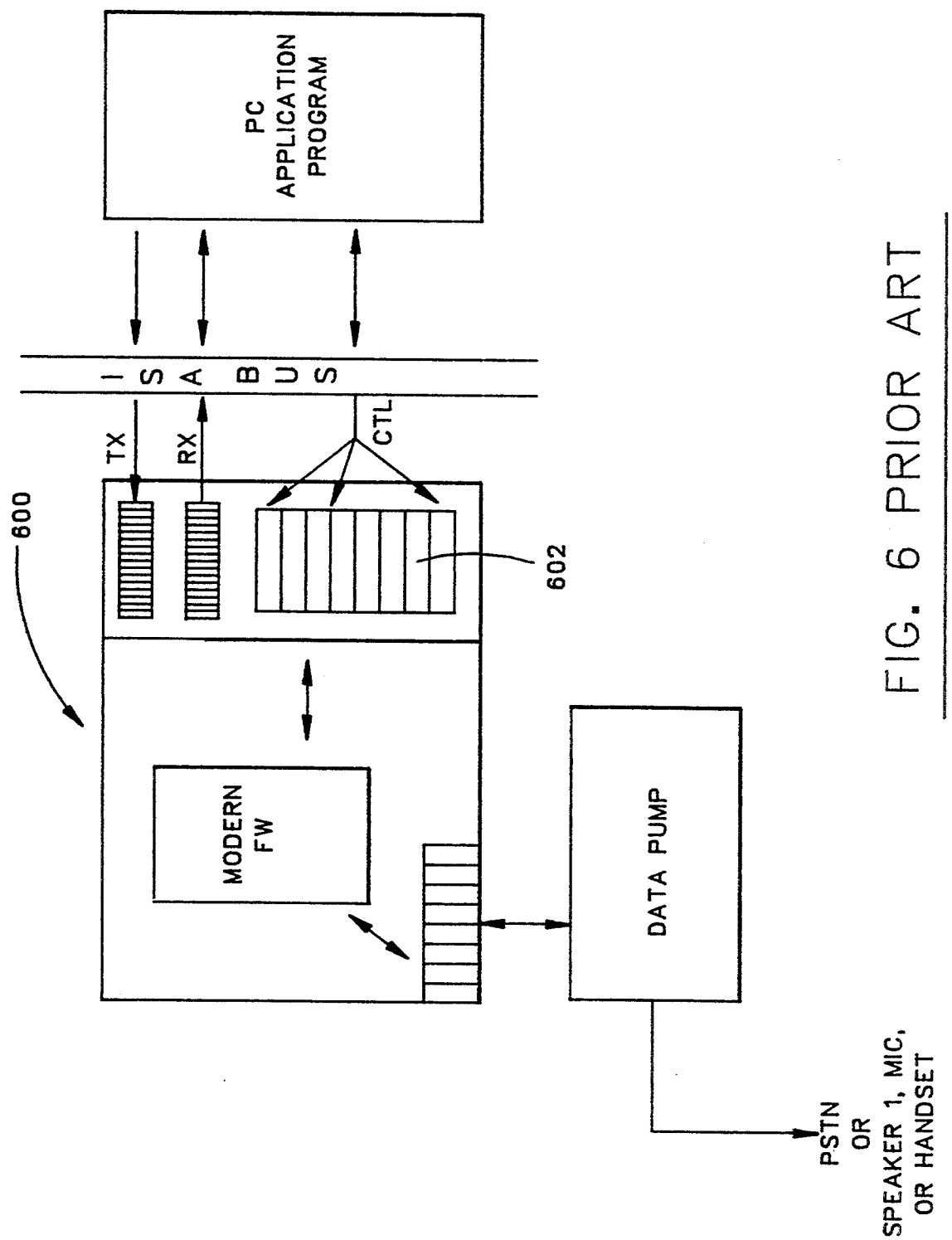

FIGS. 3 and 4 describe generally the high speed interface communications between the modem 16 and the DTE 12 in response to the queries and commands between the driver software and the modem firmware. FIG. 3 describes the sequence of data throughput during a data receive operation in which the DTE 12 performs various operating functions while simultaneously transmitting data through the modem peripheral 14 (FIGS. 1 and 2). FIG. 4 represents the reception of incoming data by the modem controller 24 FIG. 2) and the data transfer to the DTE as it is received from a DCE.

Each time the transmit register becomes filled 50, a block of 16 bytes of data is moved to the buffer 52 and another status bit informing the driver that the transmit register is empty 44 is sent to the driver. This empty-register status bit is different from the acknowledge bit described above in that this bit informs the DTE that the DCE can accept more data as soon as it is able to empty the transmit register. Preferably, the buffer may maintain at least 100–300 bytes or more of storage space. Because of the large storage space of the buffer RAM, the data from the transmit register can be quickly and immediately moved into the buffer without the additional overhead associated with multiple interrupts.

Consequently, the data stored in the buffer can be transmitted to the DCE as fast as the DCE can accept it. Ultimately, when the ISR runs out of data or if the DTE fails to transmit data at a predetermined minimum rate 56, the driver will exit the ISR 58 until the DTE has more data to be transmitted and the transmit register empty status bit has signalled the driver. In preferred embodiments of the present invention, the driver remains in the ISR waiting to receive another register empty status bit to send another 16 bytes of data without exiting the ISR until all of the DTE data has been sent. As a result, a significantly greater amount of data can be transmitted during a single interrupt, and a substantially shortened amount of DTE processing effort is expended to service interrupt overhead over time.

RECEIVE OPERATION

FIG. 4 is a flow diagram illustrating a data receive operation. After the serial port driver has determined 60 that high speed data throughput may be performed, the driver signals 62 the modem controller that the high speed data interface is to be activated. Consequently, as data is received by the modem, it is directed 64 into the receive register until a predetermined trigger level is reached 66. At that time, the modem firmware sends 68 an interrupt request to the driver, indicating that data is contained in the receive register and can be read by the DTE. Accordingly, the driver enters the ISR 70.

The trigger level is a predetermined value which is determined by the particular serial port driver. In embodiments of the present invention, the interrupt trigger level may be either 1, 4, 8, or 14 bytes of data, such that when the specific trigger level of data bytes are contained in the receive register, an interrupt request is sent to the driver 68. For example, if the trigger level is 14 bytes, when the modem receives at least 14 bytes of data, the DTE processing is interrupted 70 so that the data can be read out of the modem 72. If less than 14 bytes of data are stored in the register or if no additional bytes of data are received, an interrupt will nevertheless be sent to the driver after a predetermined number of character times (e.g., 3 or 4) 74.

Any additional data beyond the first 14 bytes temporarily stored in the receive register are then stored in the DCE buffer. Consequently, after the contents of the receive register are read 72 in response to the modem firmware's initial interruption of the DTE, the back-up data stored in the buffer may be moved 78 to the receive register and read out by the DTE in 14 to 16-byte blocks during the same ISR, and without further interrupts. Thus, as data is read by the DTE from the receive register 72 until the register is empty 76, the modem firmware signals the driver to indicate that even if the receive register appears empty, there is still data available in the buffer.

That is, if the firmware transfer time, which comprises the amount of wait time for the modem firmware to copy the data from the buffer into the receive register, is longer than the time for the DTE to read the data from the register, the driver is informed that more data is soon to come. Accordingly, the DTE can remain in the ISR until the data has been transferred from the buffer into the receive register. In this way, valuable processing time which would otherwise be expended on the interrupt overhead can be allocated to other operating tasks. Thus, by simply waiting briefly in the ISR, rather than completely exiting the ISR and spending significant amounts of time transferring data between interrupt and non-interrupt states, the interface embodiment of the present invention substantially minimizes the amount of time spent on interrupt overhead.

However, If the amount of wait time extends beyond a predetermined period 82 due to the modem buffer being empty 84 or other data transfer delay, the DTE serial port driver will exit out of the ISR 86 until another interrupt is received. In the present invention, however, even considering the amount of wait time expended by the DTE before it realizes that no further data will be received, it has been found that the overall data transfer rate is substantially increased since the driver does not have to exit the ISR after each block of data bytes. In accordance with embodiments of the present invention, data is not overwritten, but simply buffered. The data can then be read immediately by the DTE after an interrupt request is received or, depending upon the DTE activity and other operations, the driver may determine that no further data is to be read and will thus signal the modem controller indicating such.

The benefits of the above-described transmit and receive operations are significantly advantageous in that data can thus be transmitted to and from the DTE as fast as the driver and the modem firmware can support such throughput rates. The present invention allows a reduced number of interrupts, and associated interrupt overhead over time, on the DTE, yet provides for increased amounts of data to be transferred per interrupt. Moreover, because any excess data being transmitted or received by the DTE is buffered, rather than overwriting other data, embodiments of the present invention guard against data loss due to interrupt latency on either the DTE or DCE side, up to the limits afforded by the DCE buffer size, which is considerably larger than the 16 bytes allowed in a 16-byte deep UART. For example, even if the DTE falls behind in reading data, the DTE can essentially "catch up" later, while the writing of data can proceed at an accelerated rate.

Thus, while data transfer over existing communications lines, such as standard telephone wires, may be limited to conventional data transfer rates, the throughput rates between the DTE and DCE are substantially faster and virtually unlimited, as compared to typical UARTs and UART emulators. Accordingly, almost any device which utilizes a serial port application interface which may require effective data transfer rates of 176 Kbps or greater, e.g., a business audio application, can be upgraded by implementing high speed interface embodiments of the present invention.

In preferred embodiments of the present invention, the DTE may exit the high speed processing mode whenever desired. For example, the driver may exit the high speed interface when the application software ends a session with the modem. Alternatively, it may be desirable to maintain the high speed processing function in a background state of the PC. Preferably, the high speed mode may be entered at any time depending upon when a user installs the necessary application program driver. Or, high speed processing may be implemented whenever the prestored program software is called up manually by the user or automatically by the DTE or DCE.

It will be recognized that other sizes and types of registers may be used in addition to the single byte and 16 byte registers described herein. Furthermore, the data registers may be of the preferred FIFO type, as well as LIFO and the like. In addition, It will be recognized that the high speed interface embodiment of the present invention may be applied within other operating system drivers in cooperation with associated handshake firmware programmed into the DCE.

Moreover, it will also be recognized that embodiments of the present invention may encompass a variety of other modem configurations such as, for example, an internal data pump within the modem peripheral controller. While in other cases, the data pump may be a distinct and separate component of the modem peripheral. In addition, the modem itself may be internal or external to the DTE and DCE.

The presently disclosed embodiments are to be considered in all respects as illustrative and not restrictive. The scope of the invention should only be limited by the appended claims, rather than the foregoing description, and all changes that come within the meaning and range of equivalency of the claims are, therefore, intended to be embraced therein.

What is claimed is:

1. A data communications system for communication with a remote data processing apparatus, comprising:

data terminal equipment (DTE) for receiving and transmitting data, the DTE having a driver for controlling the reception and transmission of data;

data communication equipment (DCE) coupled to the DTE, the DCE having a plurality of registers for transferring data to and from the DTE at a desired data rate, a memory device in communication with the plurality of registers, and a DCE controller coupled to the memory device and the plurality of registers, and in communication with the DTE driver for implementing high speed data throughput between the DTE and the DCE such that data is written into and read out of the plurality of registers by the DTE at the desired data rate, wherein as the registers become filled, the data is automatically stored in the memory device;

program means coupled to the driver for enabling the DCE controller to command the DCE to cooperate with the DTE to implement high speed data processing; and communication protocol coupled to the DCE controller for controlling the rate and quantity of data transfer between the DTE and DCE to allow data to be continually transmitted or received by the DTE, wherein data is moved between the DTE and DCE without having to respond to predetermined data transfer rates or timing schemes.

2. The data communications system of claim 1, wherein data is transferred between the DTE and the DCE only during data interrupt service routines (ISRs), further wherein during said ISR all data to be transmitted or received is transferred continually at the desired data rate without additional interruptions.

3. The data communications system of claim 1, wherein the DCE comprises a modem.

4. The data communications system of claim 1, wherein the DCE comprises a facsimile machine.

5. A data throughput interface for operatively coupling data terminal equipment (DTE) to data communication equipment (DCE) having a plurality of registers including a transmit register and a receive register for temporarily storing data and for providing data status information, an associated memory storage device, and a controller, the interface comprising:

a driver defined within the DTE for providing commands to the DTE to read data during a receive operation and write data during a transmit operation, wherein the reading and writing of data occurs at a desired data rate;

program means coupled to the driver for enabling the DCE controller to command the DCE to cooperate with the DTE to implement high speed data throughput;

controller firmware defined within the controller and in communication with the driver, for sending an interrupt to the driver when data can be read or written by the DTE, wherein during a receive operation, the DTE reads as much data stored in the DCE memory storage device and the plurality of registers as desired and at the desired data rate during a single interrupt, and during a transmit operation, any desired amount of data to be transmitted by the DTE is written to the DCE at the desired data rate during a single interrupt; and communication protocol coupled to the DCE controller for controlling the rate and quantity of data transfer between the DTE and DCE to allow data to be continually transmitted or received by the DTE during each interrupt, wherein data is moved between the DTE and DCE without having to respond to predetermined data transfer rates or timing schemes.

6. The data throughput interface of claim 5, further comprising interrupt means responsive to the controller firmware and the driver, for sending an interrupt request to the DTE to write data only when the transmit register is empty.

7. The data throughput interface of claim 6, further comprising interrupt means responsive to the controller firmware and the driver, for sending an interrupt request to the DTE to read data only when the receive register contains a predetermined amount of data.

8. The data throughput interface of claim 5, further comprising communications protocol defined within the interface for querying the driver and the controller firmware to determine whether the driver is compatible with the data throughput interface.

9. The data throughput interface of claim 5, wherein the DTE comprises a personal computer.

10. A high speed data communications system, comprising:

a computer for transmitting and receiving at any desired data rate during data transfer interrupt periods;

a serial port driver coupled to the computer for controlling the transmission and reception of data by the computer;

a modem coupled to the computer for modulating and demodulating data transmitted and received by the computer, respectively, the modem having a programmable memory having control firmware to implement high speed data transfer, a controller in communication with the programmable memory and the serial port driver for executing the control firmware to manipulate the data within the modem as it is transmitted and received by the computer, the controller having interrupt means for initiating a data transfer interrupt period, at least one storage register responsive to the controller and the programmable memory for temporarily storing data to be transmitted and received by the DTE, and an associated memory device in communication with the at least one storage register, the memory device for storing and processing additional data beyond that which will fit in the at least one storage register such that DTE transmission and reception of all available data are performed at the desired data rate during each data transfer interrupt period;

command means coupled to the driver for enabling the modem controller to command the modem to cooperate with the computer to implement high speed data throughput at the desired data rate; and communication protocol coupled to the modem controller for controlling the rate and quantity of data transfer between the computer and the modem to allow data to be continually transmitted or received during each data transfer interrupt period, wherein data is moved between the computer and the modem without having to respond to predetermined data transfer rates or timing schemes.

11. The high speed data communications system of claim 10, wherein when the controller initiates said data transfer interrupt period, the serial port driver causes the DTE to transmit data to the at least one register and, when the register is filled, data is moved to the associated memory device such that as much data as desired to be transmitted by the DTE is sent to the DCE at the desired data rate during the single interrupt period.

12. The high speed data communications system of claim 10, wherein when the controller initiates said data transfer interrupt period, the serial port driver causes the DTE to read data from the at least one register, after which any data stored in the associated memory device is moved into the at least one register, such that as much data as desired to be received by the DTE is read from the DCE at a desired data rate during the single interrupt period.

13. The high speed data communications system of claim 10, wherein the computer system comprises a personal computer.

14. A method for transmitting data at high speeds from data terminal equipment (DTE) to data communication equipment (DCE), the DCE having a transmit register, a memory device, a controller, and a programmable memory, the method comprising the steps of:

(a) installing a driver in the DTE for determining when high speed data transmission will occur;

(b) programming the DCE controller with controller firmware;

(c) commanding the DCE, via the controller, to cooperate with the DTE to implement high speed data throughput at a desired high speed data rate;

(d) signalling the driver that the transmit register is empty;

(e) activating an interrupt service routine (ISR) within the driver;

(f) transmitting data to the transmit register at the desired high speed data rate in accordance with the controller firmware until the register is filled;

(g) moving the data from the transmit register to the memory device when the transmit register becomes filled;

(h) controlling the rate and quantity of data transmission between the DTE and the DCE to allow data to be continually transmitted during each ISR, wherein data is moved between the DTE and the DCE without having to respond to predetermined data transfer rates or timing schemes; and (i) repeating the preceding steps (f) and (g) until no further data is to be transmitted or a predetermined amount of time has elapsed without the occurrence of step (g), wherein large quantities of data can be transmitted during a single ISR at the desired data rate.

15. The method of claim 14, wherein the DTE is a personal computer system.

16. A method for receiving data at high speeds by data terminal equipment (DTE) from data communication equipment (DCE), the DCE having a receive register, a memory device, a controller, and a programmable memory, the method comprising the steps of:

(a) installing a driver in the DTE for determining when high speed data reception will occur;

(b) programming the DCE controller with controller firmware for implementing high speed data processing;

(c) commanding the DCE, via the controller, to cooperate with the DTE to implement high speed data throughput at a desired high speed data rate;

(d) signalling the driver that data is contained in the receive register for retrieval by the DTE;

(e) activating an interrupt service routine (ISR) within the driver;

(f) retrieving the data from the receive register at the desired high speed data rate;

(g) moving at least a predetermined amount of data from the memory device to the receive register; and (h) controlling the rate and quantity of data reception between the DTE and the DCE to allow data to be continually received during each ISR, wherein data moves between the DTE and the DCE without having to respond to predetermined data transfer rates or timing schemes; and (i) repeating the preceding steps (f) and (g) until a predetermined time period has elapsed while the receive register is empty or without the occurrence of step (g), wherein large quantities of data can be received by the DTE during a single ISR at the desired data rate.

17. The method of claim 16, wherein the DTE is a personal computer.

18. The method of claim 16, wherein the predetermined amount of data is 1, 4, 8, or 14 bytes of data.

* * * * *